United States Patent [11] 3,623,997

[72] Inventor Thomas C. Powell
West Alexandria, Ohio
[21] Appl. No. 555,279
[22] Filed June 6, 1966
[45] Patented Nov. 30, 1971
[73] Assignee The National Cash Register Company
Dayton, Ohio

[54] WALL-SEALING TREATMENT FOR MINUTE CAPSULES AND MINUTE CAPSULES HAVING WALLS OF SEALED POLYMERIC MATERIAL
13 Claims, No Drawings

[52] U.S. Cl. ................................................. 252/316,
117/100 A, 117/100 B, 424/33, 424/35, 424/38,
424/230, 424/324, 424/330
[51] Int. Cl. ................................................. B01j 13/02,
B44d 1/02, A61k 9/04

[50] Field of Search ........................................... 252/316;
117/100 O, 63; 167/82–83 DF; 264/341; 424/35, 38

[56] References Cited
UNITED STATES PATENTS
3,155,590  11/1964  Miller et al. ................... 167/83
FOREIGN PATENTS
956,300  4/1964  Great Britain ................ 117/100 O

*Primary Examiner*—Richard D. Lovering
*Attorneys*—Louis A. Kline and Justin S. Compton ABSTRACT: A method is provided for treating preformed, solvent-swollen, capsule walls, en masse, with an organic solvent solution of waxy material. The capsule walls, on being subsequently dried, retain an amount of the treatment material which serves to modify physical characteristics of the capsule wall by providing a degree of hydrophobicity thereto.

WALL-SEALING TREATMENT FOR MINUTE CAPSULES AND MINUTE CAPSULES HAVING WALLS OF SEALED POLYMERIC MATERIAL

This invention relates to a method for sealing the polymeric material walls of minute capsules by treating such capsules with waxy material, en masse, while the walls are swollen by imbibed solvent. It more specifically pertains to the treatment of the capsule wall material with the aim of (a) controlling the release rate of the capsule contents by liquid-leaching action through the capsule wall, (b) preserving the stability of water-sensitive capsule contents under high relative humidity storage conditions, and (c) adjusting the release rate of capsule contents through the walls in elevated environmental liquid media temperatures.

In the art of producing minute capsules which contain water-sensitive materials, the use of hydrophobic polymeric wall materials, such as ethyl cellulose, is well known. In encapsulating procedures such as those discussed in U.S. Pat. No. 3,155,590, which issued Nov. 3, 1964, on the application of Robert E. Miller and Jerrold L. Anderson, the hydrophobic film-forming materials are dissolved in an organic solvent in which the intended capsule contents is dispersed as particles, and a second polymeric material is added, which serves to act as a phase separation inducer. At a warm manufacturing temperature of less than 80° C., the hydrophobic film-forming material separates as liquid polymer-rich globules from the manufacturing medium, and deposits on, and forms embryonic seamless liquid walls about, each individual particle as a capsule core entity. This leaves the solvent-poor walls and contents in a solvent-rich equilibrium liquid. Because the phase separation of polymeric materials from a liquid system is an equilibrium process, an amount of the phase-separation-inducing polymeric material can be found in both the solvent-rich phase and the solvent-poor phase of the encapsulation system.

In a first form of the invention, once the capsules are formed with the solvent-swollen walls and an equilibrium is reached in the system, there is introduced into the system a solution of a waxy material in the same kind of solvent as that used in the system. In reaching a new equilibrium, the waxy material is distributed by diffusion into the solvent in the wall material according to the concentration gradient in existence across the interface between the external phase and the capsule wall phase. Upon the solvent's being eliminated from the capsule walls by drying, the wax is left as a residue in the walls. The capsule walls, in shrinking on solvent loss, entrap the wax tightly as a sealing material.

In another form of the invention, the untreated capsules are recovered from the manufacturing system in dried form and then redispersed in a solution of a wall-swelling solvent and a wax, to achieve the same wax penetration of the wall by absorption to a point where substantial equilibrium is reached. The capsules are then dried, as in the first form of the invention. The drying may be by any mode of eliminating solvent.

The establishment of the equilibrium state, wherein the waxy material is carried into the walls, may take several minutes, as the diffusion rate through the wall material is slow.

Sealing materials which can be utilized in the practice of this invention include natural and synthetic waxes which are soluble in solvents otherwise eligible for such capsule wall treatment. Eligibility of a solvent is decided by its ability to swell but not dissolve capsule walls at the process temperature. In that respect, an "eligible" solvent is one which is a poor solvent for the wall material. Waxes which have been applied to the practice of this invention include paraffin wax, beeswax, glycerol tristearate, microcrystalline wax, polyethylene-polyvinylacetate copolymer, and combinations of the above. The preferred treatment material is paraffin wax, but other, equivalent, materials can be used with success, the only requirement being that which was previously stated—that property of adequate solubility in the manufacturing vehicle solvent.

While the preferred embodiment of this invention utilizes capsule wall materials which are substantially ethyl cellulose, other polymeric film-forming materials, such as polyvinyl pyrrolidone, polyvinyl pyrrolidone-vinyl acetate copolymers, or vinyl chloride-vinyl acetate copolymers, can be used. Capsules prepared by the techniques and with the materials described in U.S. Pat. No. 3,341,416 issued Sept. 12, 1967 on the application of Jerrold L. Anderson, Gary L. Gardner, and Noble H. Yoshida and in the previously mentioned U.S. Pat. No. 3,155,590 can be treated by this invention, provided that they are in a solvent-swollen condition in an eligible solvent, which is not necessarily the solvent in which they were manufactured.

The contents of capsules to be treated by the novel method generally are unimportant, because the treatment affects only the capsule walls unless the contents happens to be soluble in the treatment solvent or reactive therewith. A few of the materials which have been included as core materials in the treated capsules as aspirin, N–acetyl–p–aminophenol, phenylephrine hydrochloride, amphetamine sulfate, chlorpheniramine maleate, meprobamate, spiramycin, oxytetracycline hydrochloride, potassium penicillin G, sodium fluorescein, sodium bicarbonate, potassium chloride, and ammonium dichromate.

In the above discussion, this invention has been defined in general terms. Preferred and other specific embodiments of the invention will now be described. The examples of both materials and process techniques should be considered illustrative of, and not limiting, the practice of the invention, as it will be seen that unspecified variations in the examples of the invention do not detract from the spirit of the invention.

EXAMPLE 1

Preferred Embodiment

In the encapsulation of N-acetyl-p-aminophenol (APAP), the following materials were placed in a jacketed vessel equipped for agitation:

5,000 g. cyclohexane
100 g. polyethylene, as later specified
100 g. ethyl cellulose, as later specified
500 g. APAP (250-micron particle size)

The polyethylene used was low-viscosity material having a molecular weight of approximately 7,000 and a ring and ball softening point of 100 to 101° C. as determined according to the American Society for Testing Materials Specification D–36–26 ("Epolene C–10" as sold by Eastman Chemical Products, Kingsport, Tenn. United States of America). The ethyl cellulose material had an ethoxyl content of 48.0 percent to 49.5 percent, by weight, and a viscosity, at 25° C., of 90 to 105 centipoises as measured by an Ubbelohde viscometer in a 5 percent, by weight, solution of the ethyl cellulose in a solvent mixture of 80–20 toluene-ethanol.

Agitation was initiated sufficient to keep the APAP particles in suspension, and the vessel contents were heated. When 80° C. was attained, the heat source was removed, and the agitating system was allowed to cool to 35° C. Agitation then was stopped, and, after the now-encapsulated core particles were allowed to settle as a capsule mass, the cyclohexane manufacturing solvent was decanted. The capsules were washed by adding 2,500 g. of pure cyclohexane to the capsule-containing vessel and agitating the system for about 15 minutes or slightly longer. The capsules were again allowed to settle, and the cyclohexane was decanted. Two further washes were performed in the same manner. After washing was completed, the remaining capsule slurry was filtered to a cake and dried, by evaporation of the solvent, to form particulate capsules.

One hundred g. of the so-prepared dried capsules was dispersed in 500 g. of a 20 percent, by weight, cyclohexane solution of paraffin wax, which is a purified mixture of solid petroleum hydrocarbons having a melting point range of 43 to 66° C., depending on the grade of wax used. The mixture was agitated at about room temperature for about one-half hour or slightly less, after which time the treated capsules were separated from the wax-containing solvent system by filtration and were dried by circulated air maintained at about 25° C. As a test, samples of the treated (a) and the untreated (b) APAP-containing capsules were evaluated as to release by a leaching action induced through the capsule wall at 37° C. in an aqueous system buffered at 1.2 pH (simulated gastric environment). The following table shows results of that test in terms of the percentage of total core material released at specified times during the test.

| Hours | (a) Treated | (b) Untreated |
|---|---|---|
| 1 | 19.6% | 34.4% |
| 2 | 35.4% | 67.8% |
| 3 | 48.1% | 85.0% |
| 4 | 56.9% | — |
| 5 | 64.0% | — |

It is readily seen that the treated capsules released the APAP much more slowly than did the untreated capsules in the same simulated gastric environment, which was the object to be achieved.

The foregoing is an example of the invention carried on after removal of the capsules from the manufacturing vehicle.

EXAMPLE 2

In this example, capsules were prepared by the same technique as in example 1 with the exception that 900 g. of acetylsalicylic acid (aspirin) having an average particle size of less than 840 microns was substituted for the APAP of that example. As an example of the ability to vary capsule release characteristics by the use of different waxes, two treatments were performed on separate dried capsule samples from this encapsulation batch. The first treatment, sample c, utilized the paraffin wax of example 1, and the second treatment, sample d, utilized a wax combination of 80 percent, by weight, paraffin and 20 percent, by weight, polyethylene-polyvinyl acetate copolymer having 27 percent to 29 percent, by weight, vinyl acetate content and a number average molecular weight of 240,000 ("Elvax 250", as sold by E. I. duPont deNemours and Company, Incorporated, Wilmington, Del., United States of America). In each of the treatments c and d, the technique was similar to that in example 1 except for the type of wax. As a test of release characteristics, samples of c paraffin-treated capsules, d wax mixture-treated capsules, and e untreated capsules were evaluated separately in identical aqueous systems buffered at 7.4 pH and kept at 37° C. to simulate one enteric environment. The following table shows results of that test in terms of the percentage of the total capsule-content material released at specified times during the test.

| Hours | (c) Paraffin-treated | (d) Paraffin-co-polymer-treated | (e) Untreated |
|---|---|---|---|
| 1 | 1.0% | 2.6% | 3.6% |
| 2 | 1.4% | 4.4% | 6.3% |
| 3 | 1.9% | 6.2% | 9.7% |
| 4 | 2.5% | 8.1% | 13.0% |
| 5 | 3.0% | 9.7% | 15.8% |

From the above data, it is apparent that release characteristics can be varied by the type of wax or mixture of waxes used in the treatment of the capsules, untreated capsules being rapid in release rate.

EXAMPLE 3

In this example, capsules containing APAP were prepared and treated as in example 1 with the exception that a portion of the capsules were wax-treated during the third cyclohexane wash rather than washed, dried, and then redispersed for wax treatment. Wax concentration in the third wash solvent was 20 percent, by weight. In this case, the wax treatment became a step in the process of preparing the capsules for recovery from the manufacturing liquid. First-hour test results were 12.6 percent of the total APAP released from the treated capsules and 43.0 percent of the total APAP released from the untreated capsules in an aqueous, 1.2 pH-buffered, solution maintained at 37° C.

EXAMPLE 4

Phenylephrine hydrochloride, as core material, was encapsulated by the same technique as in example 1. To prepare the intended core material for encapsulation, it was intimately combined with an amount of 10 percent, by weight, aqueous gum arabic solution sufficient to yield a doughy consistency. This mass was then passed through a wet granulator to granulate it, dried, and the product sieved. Two hundred g. of the granulated material having an average granule size of 590 to 840 microns were substituted for the APAP in the encapsulation formula of example 1. After encapsulation, one portion f of the dried capsules was treated using paraffin wax, and a second portion g was treated using glycerol tristearate according to the teaching of this invention. These two kinds of treated capsules, f and g, were tested against nontreated capsules h in an aqueous, 1.2 pH-buffered solution maintained at 37° C. The following table shows results of the test in terms of percentage of total core material released at a specified time during the test.

| Hours | (f) Paraffin-treated | (g) Glycerol tri-stearate-treated | (h) Untreated |
|---|---|---|---|
| 0.5 | — | 20.5% | 45.0% |
| 1.0 | 20.0% | 38.5% | 62.0% |
| 1.5 | — | — | 70.5% |
| 2.0 | 31.0% | 57.0% | 75.5% |
| 2.5 | — | — | 79.5% |
| 3.0 | 40.5% | 66.6% | 92.0% |

EXAMPLE 5

Amphetamine phosphate was granulated according to the technique of the previous example, and 600 g. of the granules having an average size of 420 to 840 microns was substituted for the APAP in the encapsulation formula of example 1. After encapsulation, one portion of the capsules was treated, as before, with paraffin. The release characteristics of the wax-treated i and untreated j capsules were compared at 37° C. in an aqueous system in which the buffered pH was varied from 1.2 (at 1 hour) to 7.4 (at 6 hours) finally, to simulate a gastrointestinal environment. The following table shows the test results in terms of percentage of total capsule content released at a specified time during the test:

| Hours | (i) Treated | (j) Untreated |
|---|---|---|
| 1 | 12.5% | 86.3% |
| 2 | 19.3% | 92.0% |
| 4 | 30.7% | — |
| 6 | 42.1% | — |

Although specific amounts and concentrations of materials have been recommended, it must be understood, as obvious, that the nature of the novel wax treatment allows numerous variations within the implications of the invention. The wax-solvent system is optimum in most cases, at about 20 percent, by weight, wax, but it functions properly at any lower wax concentration—the effect of the treatment only being decreased accordingly in degree. At wax concentrations above the optimum, there is a tendency for excess wax to remain undissolved and to cover the capsule walls in the form of a wax-particle coating. Such a second coating should be used guardedly, as it increases manufacturing and processing costs and alters the release characteristics of the capsules, which may or may not be desirable. The process "soaking" time which has been suggested in the examples represents only a practical operating time. The treatment involves establishment of an equilibrium of solvent solutions, that within the capsule wall material being impeded in mobility. In some cases, equilibrium may be substantially established in 5 minutes or less, and, in other cases, it might require a matter of hours, depending, again, upon the kind of wax used for treatment and its concentration, and upon the condition of the wall material. The temperature of the treatment solutions in these examples was about 20 to 25° C., unless otherwise noted, but the treatment can be carried on at any temperature within a range which, at its lowest, is that at which the treatment wax just remains in solution up to, at the highest, the temperature at which the solvent or the environment begins to degrade the capsule wall material.

It should now be understood that there are several things which must be adjusted to cooperate in the practice of this invention, none of which need be exactly specified but all of which can be easily determined empirically by one skilled in the art. In general, the wax is carried into the wall material, where it stays, locked in by shrinkage of the polymeric material of the wall on drying.

What is claimed is:

1. A process for treating organic liquid-swollen polymeric film-forming material composing the walls of minute capsules to render them sealed against liquid diffusion extraction of the capsule contents, which includes the steps of
   a. dispersing the minute capsules in an organic liquid capable of swelling but not dissolving the capsule walls, said organic liquid having dissolved in it a wax which, in such solution state, permeates the swollen capsule walls,
   b. separating the wax solution-permeated capsules from the residual wax-containing liquid, and
   c. removing the liquid from the capsule walls.

2. The process of claim 1 wherein the capsule walls consist substantially of ethyl cellulose polymeric material.

3. The process of claim 2 wherein the liquid is substantially cyclohexane.

4. The process of claim 3 wherein the wax is substantially paraffin wax.

5. A process for treating, in the latter stages of en masse capsule manufacture carried on in a liquid vehicle, solvent-swollen polymeric material composing the walls of capsules, said process including the steps of
   a. establishing a slurry by dispersing the capsules having solvent-swollen walls in a liquid solvent-miscible solution of wax, said solution penetrating the swollen capsule walls,
   b. separating the capsules from the wax-containing liquid that is free after substantial solution equilibrium has been attained, and
   c. removing the residual liquid from the capsule walls.

6. The process of claim 5 wherein the capsule walls consist substantially of ethyl cellulose polymeric material.

7. The process of claim 6 wherein the liquid is substantially cyclohexane.

8. The process of claim 7 in which the wax is substantially paraffin wax.

9. A minute capsule having, as a wall, hydrophobic polymeric material, which material has been permeated throughout with a waxy material.

10. The capsule of claim 9 wherein the hydrophobic wall material is ethyl cellulose polymeric material.

11. The capsule of claim 9 wherein the waxy material is substantially paraffin wax.

12. A process of treating ethyl cellulose-walled capsules to seal the walls to penetration by a leaching liquid, comprising the steps of
   a. soaking the capsules in a solution of waxy material in a solvent that swells the ethyl cellulose walls for a time until an equilibrium has been attained; and
   b. recovering the capsules from said solution and drying them of solvent, leaving the wax in the walls, which walls, by consequent shrinking, hold the wax as in a matrix.

13. A method for impregnating the polymeric film-forming material walls of capsules with a waxy sealing material, including the steps of
   a. soaking the capsules in an organic liquid solution of the waxy material, the solvent of which solution swells but does not dissolve the polymeric film-forming material, said soaking being continued until a substantial diffusion equilibrium is attained, and
   b. removing the capsules from the solution and the organic solvent from the capsule walls, leaving the waxy material as a residuum.

* * * * *